June 22, 1954
H. V. ATWELL
2,681,852
METHOD FOR PARTIAL COMBUSTION OF CARBONACEOUS MATERIALS
Filed May 28, 1948
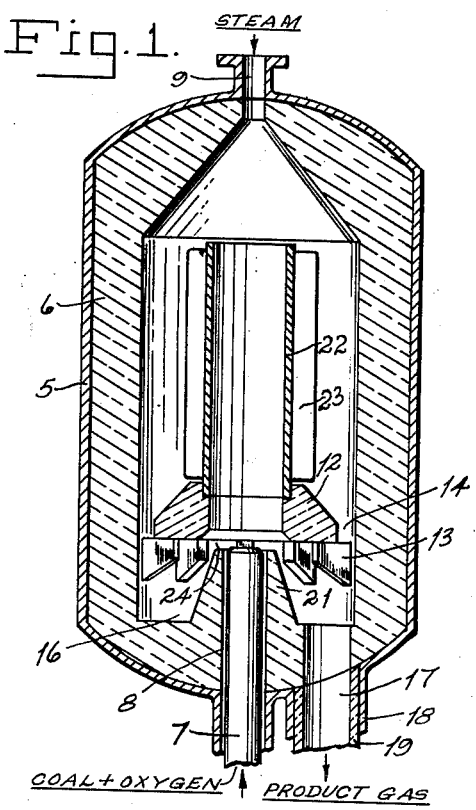
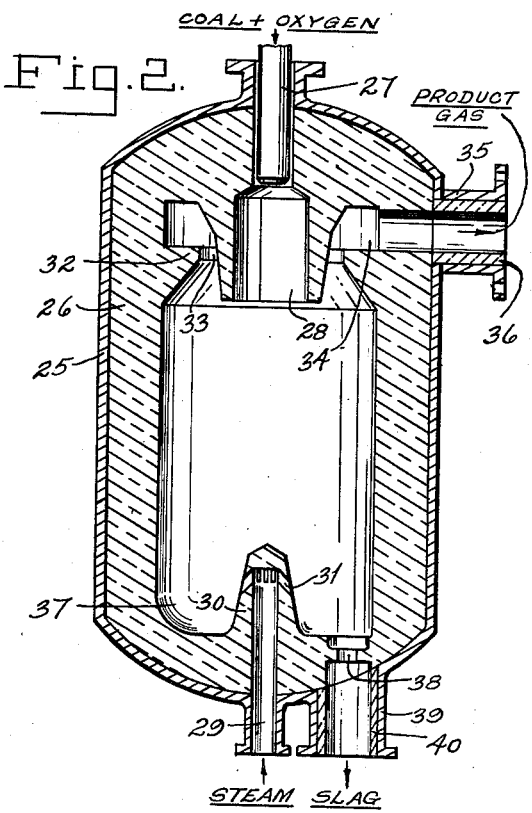
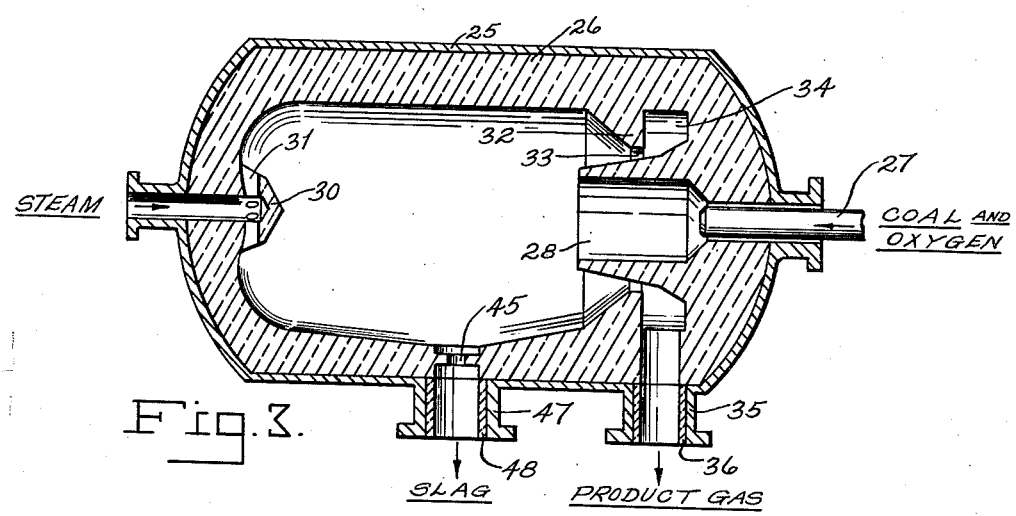
INVENTOR.
HAROLD V. ATWELL
BY
ATTORNEYS Patented June 22, 1954

2,681,852

UNITED STATES PATENT OFFICE 2,681,852

METHOD FOR PARTIAL COMBUSTION OF CARBONACEOUS MATERIALS

Harold V. Atwell, Beacon, N. Y., assignor to The Texas Company, New York, N. Y., a corporation of Delaware Application May 28, 1948, Serial No. 29,823

2 Claims. (Cl. 48—206)

This invention relates to a process and apparatus for the generation of gases comprising carbon monoxide from carbonaceous materials. In one of its more specific aspects, it relates to a process and apparatus for the generation of a mixture of carbon monoxide and hydrogen, suitable as a source of gaseous fuel or as a source of feed gas for the synthesis of hydrocarbons, from coal.

The synthesis of hydrocarbons by the interaction of carbon monoxide and hydrogen is well known. A number of processes are known to be effective for hydrocarbon synthesis. In general liquid hydrocarbons are most effectively produced by the interaction of carbon monoxide and hydrogen at an elevated temperature and pressure in the presence of a suitable catalyst, usually an element of the iron group of the periodic table of the elements.

The present invention is concerned primarily with the generation of a mixture of carbon monoxide and hydrogen from solid carbonaceous materials by partial oxidation. The invention is particularly suited to the production of a mixture of carbon monoxide and hydrogen which, after suitable treatment to remove impurities, adjust the ratio of carbon monoxide to hydrogen, and the like, may be used as a feed gas for the synthesis of hydrocarbons. Various solid carbonaceous fuels may be used in the process, e. g., coal, lignite, and the like.

An object of this invention is to provide an improved process for the generation of carbon monoxide from solid carbonaceous materials. Another object is to provide a process particularly suited to the generation of a mixture of carbon monoxide and hydrogen from solid carbonaceous materials as a source of feed gas for the synthesis of hydrocarbons. A further object of this invention is to provide improved apparatus for the generation of carbon monoxide and hydrogen from solid carbonaceous materials in particulate form.

Gasification of powdered coal by partial combustion with oxygen has been proposed heretofore. Such processes and apparatus have not been, in general, commercially successful. Reactors of this sort were tried in Germany but were not developed beyond the experimental stage. Many problems remained unsolved when the work was abandoned. Difficulties particularly were experienced in obtaining high carbon monoxide to carbon dioxide ratios in the product gas while maintaining substantially complete utilization of carbon. Other difficulties were experienced with overheating of the refractory walls of the reactor and in preventing undesirable slag accumulation due to fusion of the ash.

The method and apparatus of this invention provide a high rate of carbon reaction, resulting in efficient carbon utilization. In the apparatus of the invention, molten ash or slag may be handled without particular difficulty due to the particular method of handling the reactants and the improved apparatus. Where it is desirable to operate at temperatures which result in slagging, i. e., at temperatures above about 2000° F., the molten slag is maintained in fluid condition and efficiently removed from the reactor without excessive build-up on the walls.

In the gasification of carbonaceous materials, particularly solid fuels, with oxygen, the reaction between the oxygen and fuel results in the production of carbon dioxide according to the equation:

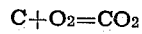
$$C + O_2 = CO_2$$

The oxidation reaction, being highly exothermic, releases large quantities of heat.

The carbon dioxide so produced, in contact with hot carbon, in turn reacts with the carbon to produce carbon monoxide:

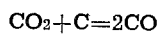
$$CO_2 + C = 2CO$$

Steam also reacts with heated carbon to produce carbon monoxide and hydrogen:

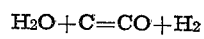
$$H_2O + C = CO + H_2$$

These reactions are endothermic and require heat from another source.

Heat for the endothermic reactions may be supplied from the exothermic reaction. Thus, in a gas generator there should be a free transfer of heat between the zone in which carbon dioxide is formed and the zone in which carbon dioxide is consumed by reaction with carbon.

The water gas shift reaction:

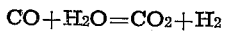
$$CO + H_2O = CO_2 + H_2$$

also takes place in the generator. The water gas shift reaction has little influence on the thermal balance in the generator. At high temperatures, above about 1500° F., the products on the left hand side of the equation tend to predominate as governed by the well known laws of chemical equilibria whereas the converse is true at low temperatures. The quantity of hydrogen in the product gas may be controlled by control of conditions affecting the water gas shift reaction.

Hydrogen may be generated at the expense of carbon monoxide in the generator or in a separate shift converter, as is known in the art. If desired, the reaction effluent from the generator may be quenched to avoid composition changes due to the water gas shift reaction which takes place on slow cooling of the product gases. The water gas shift reaction is substantially arrested by cooling to a temperature below about 1500° F.

Since the gasification of various solid carbonaceous materials is known in the art, the application of the present invention to solid carbonaceous feed materials other than coal will be evident to one skilled in the art from the detailed description of this invention and the illustrative examples of its application to coal.

In accordance with this invention crushed coal of a particle size less than one half inch, and preferably less than one quarter inch in diameter is charged into the reaction zone. Oxygen is introduced into the reactor into intimate contact with the particles of coal. The oxygen preferably is introduced separately, and admixed with the coal at the point of introduction to the reaction zone, but under some conditions it may be admixed with the coal prior to introduction to the reactor. Steam or other innocuous gas may be used to propel the coal into the reactor where direct admixture with oxygen is not permissible. Preferably, the oxygen is supplied as an oxygen concentrate wherein the oxygen-containing gas contains 90 per cent oxygen or more by volume. Oxygen produced by many of the commercial oxygen processes is suitable as a source of oxygen feed to the generator.

It is generally desirable to preheat the reactants prior to introduction to the reactor. Preferably, the reactants are heated to a temperature of at least 400–600° F. prior to introduction into the reactor. Higher temperatures are still more advantageous and may range to a temperature as high as materials of construction permit. Steam, for example, may be heated to temperatures of 1000–1500° F., in tube type furnaces and as high as about 3000 to 4000° F. by direct contact with hot solids. The pebble heater is suitable for heating steam or other gases to temperatures above 1000° F.

Due to the novel manner in which the reactants are fed into and the gaseous products withdrawn from the reaction zone efficient heat transfer between the exothermic and endothermic reactions is assured and effective reaction conditions are maintained. The relative relationship of exothermic and endothermic reactions within the reactor also serve to permit advantageous operating conditions in that maximum temperatures may be used for any permissible wall temperature. It will be understood that wall temperatures are limited by available materials of construction. By the process of this invention the exothermic reaction is carried out in the interior of a reaction zone surrounded by the reactants of the endothermic reactions. This may be accomplished by burning the carbon with oxygen in the central area of a reaction zone and directing reaction products, hot carbon particles and steam along a path adjacent the inner walls of the zone to form an envelope surrounding the combustion reaction.

The invention contemplates the reaction of a solid carbonaceous material with a limited quantity of free oxygen in a closed reaction zone comprising a substantially open or unobstructed space. In a preferred embodiment the reactants, for example, concentrated oxygen and coal, are introduced into a cylindrical reaction zone along the axis thereof from one end of the zone and the reaction products withdrawn from the same end of the reaction zone. The reactants are injected as a stream in unobstructed unidirectional flow. The reactants and the resulting reaction products reverse direction near the opposite end of the zone so that the endothermic reactants and product gases move in a countercurrent stream adjacent the stream of incoming reactants and exothermic reaction products. In this manner efficient heat exchange takes place between the exothermic and the endothermic reactions.

In accordance with the broad aspect of this invention, two reactant streams, namely the incoming stream and the reverse flow stream, may occupy any respective adjacent portions of a reaction zone wherein they may move without substantial intermixing. It has been found particularly advantageous to introduce the reactants axially at one end of a reaction zone causing them to move longitudinally as a central stream along the axis, which stream is thereafter returned in the opposite direction to form a countercurrently flowing stream in annular relationship to the incoming stream of reactants. In this way the reversely moving stream forms a sheath about the central stream of reactants in direct heat transfer relationship therewith. Radiant thermal energy liberated by the exothermic reaction is transmitted directly to the endothermic reactants. At the same time, heat in the form of specific heat of the reaction products and unreacted carbon from the exothermic reaction is available to supply heat for the endothermic reactions. The resulting compact reactor required for this type of reaction is extremely efficient in that heat liberated by oxidation of the coal is utilized most effectively in the endothermic reactions to give maximum yields of hydrogen and carbon monoxide. The required reactor volume thereby approaches the minimum.

In a related application of Leon Jacolev and Irvine F. German, Jr., Serial No. 29,866 filed concurrently herewith (now U. S. Patent No. 2,581,700), a similar principle is used in the generation of synthesis gas from gaseous hydrocarbons.

Elevated temperature and pressure are beneficial to the desired reactions in the overall process. Temperatures within the range of 2000–4000° F. are desirable; the temperature is limited by the available materials of construction. Temperatures as high as materials of construction will permit are desirable to give high reaction rates, particularly in the case of the endothermic reactions. Elevated pressure increases the concentrations of the gaseous reactants. Preferably, a pressure in excess of 100 pounds per square inch gauge is used.

The apparatus described herein and forming a part of my invention provides for carrying out the reaction in a most efficient manner as will be more fully brought out in the following detailed description with reference to the accompanying drawings.

Figure 1 is a vertical cross sectional view through a reactor embodying the principles of this invention.

Figure 2 is a vertical cross section through another modification of apparatus forming a part of the present invention.

Figure 3 is a vertical cross section through a modified form of the apparatus illustrated in Figure 2.

With reference to Figure 1 of the drawings, the generator is provided with an outer cylinder steel shell 5 capable of withstanding an elevated pressure and a refractory lining 6 of a material suited to the temperature conditions encountered in operation. Crushed coal and oxygen are admitted through a suitable burner nozzle 7 suitably of conventional design into the reactor through a port 8. The coal may be propelled to the point of introduction to the reaction zone by means of steam or other gases as is known in the art. Preferably steam is admixed with the coal as a propellant and the coal and oxygen mixed at the point of introduction to the reaction space. Burning takes place within the reactor after the reactants leave the tip of nozzle 7. The reactants are directed upwardly along the axis of the reactor at relatively high velocity. Suitable provisions may be made for cooling of the nozzle 7 as is known in the art.

The oxygen and coal react immediately within the reaction zone with liberation of large quantities of heat. The ratio of oxygen to coal is such that the coal is incompletely burned and particles of free carbon at an elevated temperature are thus entrained in the gas stream. The gases and the heated carbon particles are carried upwardly generally along the axis of the reactor toward the opposite end thereof. Steam is introduced at the opposite end of the reactor through port 9. The upper portion of the reactor preferably is shaped so the area gradually increases in the direction of steam flow from the diameter of the steam port to the reactor diameter. This tends to distribute the steam evenly along the walls of the reactor.

The hot gases from the exothermic reaction mix with the steam and reverse direction of flow passing downwardly adjacent the walls of the reactor.

A distributing ring 12 may be provided for improved distribution of reactants. Ring 12 is supported from the reactor wall by support members 13. Distributing ring 12 is spaced from the reactor walls by an amount sufficient to provide an annular passageway 14 adjacent the reactor wall for withdrawal of the reaction effluents.

Product gases and ungasified residue, in liquid or particulate solid form are collected in an annular collecting duct 16. The effluents are discharged from the reactor through an outlet 17 pipe comprising a steel shell 18 with a refractory lining 19.

A shield 21 surrounds the inlet nozzle 7 to protect the nozzle from heat and from molten slag or ash which may be formed by the reaction. A chimney 22 is optionally provided to separate mechanically the upflowing stream of reactants from the downflowing reactants and products. Molten ash or slag thrown out of the gas stream runs down the inner wall of the chimney 22 through the corresponding opening in ring 12 and is deflected by the burner shield 21 into the annular duct 16.

Solid particles which are not in the molten state are carried upwardly with the gas stream through chimney 22 then downwardly through the annular space defined by the walls of the reactor and chimney 22 and finally into the annular duct 16. Solid particles or molten ash and slag and product gases are discharged from the reactor through line 17. The product gases may be separated from the solid or molten ash in suitable apparatus of more or less conventional design forming no part of the present invention.

The ring 12 serves to distribute the product gases more or less evenly along the walls of the reactor to insure even temperatures and uniform protection of the reactor walls. The opening 24 between the burner shield 21 and ring 12 permits molten ash and slag to drain into annular duct 16. Opening 24 may be set so that substantially no intermixing of the product gases and the incoming reactants takes place. Generally, however, it is desirable to space ring 12 from burner shield 21 by an amount sufficient to permit inspiration of a substantial quantity of gases from the duct 16 through the annular opening 24. This prevents overheating of ring 12 and the chimney 22. Any desired degree of mixing of the incoming reactants with the product gases may be effected by proper design and arrangement of the elements of the reactor.

The chimney 22 may be provided with a plurality of ribs or fins 23 to increase its surface area externally and thereby increase the transfer of heat by radiation and convection to the gas stream in the annular passageway.

Product gases comprising carbon monoxide and hydrogen are withdrawn from the reactor at a point adjacent the point of introduction of the reactants. Heat from the product gas stream may be utilized by passing the gas stream through a waste heat boiler for the generation of steam. The product gas may be quenched, for example, by contact with a spray of water if desired to stop the reactions. Any entrained particles of molten ash or slag discharged with the synthesis gas are converted on cooling, as by a water quench, to small solid particles which may be readily removed from the synthesis gas.

In the description of the apparatus, the coal and oxygen enter a port at one end of a cylindrical reactor and the steam enters an opposing part at the opposite end of the reactor. This particular arrangement is very satisfactory and generally preferred but it is not essential to successful operation. Steam may be added at other points in the reactor. For example, it may be introduced through a series of ports along the outer wall of the generator, not illustrated in the drawing, so arranged that the flow of steam aids in reversing the flow of reaction products from the exothermic reaction. Some oxygen, for example, may be introduced with the steam and some steam may enter with the coal and oxygen. Other reactants, such as carbon dioxide or a hydrocarbon gas, for example, may be introduced also. The particular apparatus and novel method of this invention offer advantages of simplicity and trouble-free operation while retaining efficiency of operation not realized by more complex type generators of the prior act.

With reference to Figure 2 of the drawings, the modification illustrated is provided with an outer cylindrical steel shell 25 and a refractory lining 26. Crushed coal and oxygen are admitted to the generator through burner nozzle 27 into a combustion chamber 28. The combustion chamber is designed to provide an exothermic reaction zone of restricted cross sectional area. The gases generated by the exothermic reaction are directed along the axis of the generator in a substantially uniform stream. The reactants, products of the exothermic reaction and heated carbonaceous material are thus directed downwardly along the axis of the reactor at relatively high velocity.

Steam is introduced through port 29 into an injection nozzle 30 from which it is directed through a series of openings 31 outwardly toward the walls of the reactor. The steam, in addition to supplying water vapor for reaction, aids in reversing the flow of products from the combustion chamber 28. The resulting mixture of combustion products and steam is directed upwardly along the walls of the reaction zone counter-current to the flow or primary reactants.

A collar 32 is provided at the upper end of the reaction zone adjacent the combustion chamber.

An annular passageway 33 between the combustion chamber 28 and the collar 32 serves as an outlet for the product gases. This passageway is of restricted cross sectional area and aids in maintaining at even distribution of product gases along the walls of the reactor. The product gases are collected by the annular duct 34 and discharged from the reactor through a pipe 35 provided with a suitable refractory lining 36. Gases passing out of the generator through passageway 33 and duct 34 serve to prevent overheating of the combustion chamber 28. If desired, additional provision may be made for cooling of the combustion chamber as will be apparent to those skilled in the art. It is generally preferable to design and operate the reactor without such additional cooling so that the heat generated in the combustion zone 28 is utilized to the utmost degree in the reactions.

Molten ash or slag formed in the reaction zone collects at the bottom of the reaction zone in the annular slag pit 37 surrounding the steam nozzle 30. The slag is discharged through port 38 into a slag disposal line 39 provided with a suitable refractory lining 40.

Operation of the generator of Figure 2 is substantially the same as that of Figure 1 already described. Slag and product gases are discharged separately in Figure 2 as illustrated. The steam entering through the injection nozzle 30 is directed by openings 31 into contact with molten slag in the slag pit 37 and hence into contact with any particles of heated carbon associated therewith. The carbon is thus given an opportunity to react with the steam, resulting in improved carbon clean-up in the slag. Some particles of carbon remain entrained in the gas stream and are reacted in the upwardly flowing stream. Unreacted solid particles are discharged through the annular opening 33 and carried out through pipe 35 with the product gases from which they may be separated without difficulty.

With reference to Figure 3 of the drawings, a modification of Figure 2 is illustrated wherein the apparatus of Figure 2 is operated in a horizontal position. The parts in Figure 3 are numbered to correspond to similarly positioned corresponding parts of Figure 2. In this embodiment, a slag tap 45 is provided at the lowermost point of the generator wall. The wall preferably is sloped from the ends toward the slag tap 45 as illustrated to facilitate drainage of the slag from the generator. The molten ash and slag are discharged through a slag line 47 provided with a protective lining 48.

It will be obvious to those skilled in the art that the apparatus of this invention may be operated in almost any desired position. The figures are illustrative of horizontal flow, downflow, and upflow of the solid carbonaceous material. From these illustrations, numerous combinations will be evident to one skilled in the art.

Obviously many modifications and variations of the invention as hereinbefore set forth may be made without departing from the spirit and scope thereof and therefore only such limitations should be made as are indicated in the appended claims.

I claim:

1. In a process for the production of carbon monoxide and hydrogen by reaction of a solid carbonaceous fuel in particle form with steam and uncombined oxygen wherein said reaction is conducted at a temperature above about 2,000° F. autogenously maintained by said reaction, the improvement which comprises introducing said fuel and oxygen substantially free from steam into one end of a compact unobstructed reaction zone, effecting reaction of only a portion of said fuel with substantially all of said oxygen forming a stream of primary reaction products containing unconsumed fuel particles and flowing said stream of primary reaction products through a predetermined path of flow along the axis of said reaction zone toward the opposite end thereof, introducing into said stream of primary reaction products at the opposite end of said reaction zone substantially all of the steam required in the process free from solid fuel, reversing the direction of flow of said stream at said opposite end of said reaction zone forming a secondary stream enveloping said primary stream and flowing countercurrent to said primary stream, and withdrawing product gases from said reaction zone from an area adjacent the point of introduction of said fuel and oxygen.

2. In a process for the production of carbon monoxide and hydrogen by reaction of a solid carbonaceous fuel in particle form with steam and uncombined oxygen wherein said reaction is conducted at a temperature above about 2,000° F. autogenously maintained by said reaction, the improvement which comprises introducing said fuel and oxygen into a first reaction zone of relatively small cross-sectional area, effecting reaction of only a portion of said fuel with substantially all of said oxygen in said first reaction zone forming a stream of primary reaction products containing unconsumed fuel particles, introducing said stream of primary reaction products into one end of a separate second reaction zone of relatively large cross-sectional area as compared to said first reaction zone and flowing said stream along the axis of said second reaction zone toward the opposite end thereof, introducing steam free from said solid fuel into the opposite end of said reaction zone into admixture with said primary reaction products, reversing the direction of flow of said stream at said opposite end of said reaction zone forming a secondary stream enveloping said primary stream and flowing countercurrent to said primary stream, and withdrawing product gases from said second reaction zone from an area adjacent the point of introduction of said stream of primary reaction products.

References Cited in the file of this patent

UNITED STATES PATENTS

| Number | Name | Date |
|---|---|---|
| 1,722,496 | Chapman | July 30, 1929 |
| 1,723,418 | Hackford | Aug. 6, 1929 |
| 1,812,080 | Chapman | June 30, 1931 |
| 1,836,627 | Suffern | Dec. 15, 1931 |
| 1,924,856 | Heller | Aug. 29, 1933 |
| 1,963,167 | Heller | June 19, 1934 |

FOREIGN PATENTS

| Number | Country | Date |
|---|---|---|
| 413,130 | Great Britain | July 12, 1934 |

OTHER REFERENCES

"Industrial and Engineering Chemistry," vol. 40, pages 567–570, April 1948.

Haslam et al.: "Fuels and Their Combustion," 1926, page 450.